United States Patent [19]

Warshawsky

[11] Patent Number: 4,726,552

[45] Date of Patent: Feb. 23, 1988

[54] LAMP SWIVEL

[76] Inventor: Jerome Warshawsky, 1322 Everitt Pl., Hewlett Harbor, N.Y. 11557

[21] Appl. No.: 931,905

[22] Filed: Nov. 14, 1986

Related U.S. Application Data

[63] Continuation of Ser. No. 735,543, May 20, 1985, abandoned.

[51] Int. Cl.[4] .................................................. F16L 3/00

[52] U.S. Cl. .................................... 248/122; 248/145; 248/282; 248/415; 362/427; 362/431; 362/432; 403/164

[58] Field of Search ............... 248/122, 145, 415, 418, 248/274, 284, 291, 324, 282; 362/427, 431, 432; 403/164, 165, 78

[56] References Cited

U.S. PATENT DOCUMENTS

| | | | |
|---|---|---|---|
| 3,010,013 | 11/1961 | Guntheral et al. | 248/324 X |
| 3,044,798 | 7/1962 | Gerner | 403/164 X |
| 4,121,280 | 10/1978 | Chapman et al. | 248/282 X |
| 4,247,886 | 1/1981 | Warshawsky | 362/427 |
| 4,296,577 | 10/1981 | Schuette | 248/282 X |
| 4,347,557 | 8/1982 | Warshawsky | 403/164 X |
| 4,381,538 | 4/1983 | Warshawsky | 362/431 X |
| 4,517,632 | 5/1985 | Roos | 362/427 X |
| 4,548,373 | 10/1985 | Komura | 248/122 |

*Primary Examiner*—Ramon O. Ramirez

*Attorney, Agent, or Firm*—Stephen E. Feldman

[57] ABSTRACT

A swing arm lamp has the swing arms thereof connected to each other through a swivel assembly that includes a pair of end swivel elements and a center swivel element all disposed proximate each other and interconnected so as to rotate with respect to each other about an axis of rotation through the swivel assembly, but so that relative sliding movement along the axis of rotation of the elements with respect to each other is substantially prevented. The elements are formed of tubular stock with the center element having reduced outer diameter at each end thereof and having a circumferential groove formed about each such reduced outer diameter. The reduced outer diameter end portions of the center element, in turn, seat respectively in enlarged inner diameter end portions of the end elements. A lug is formed from the material of each such end element by displacing the wall thereof in a swaging process. The lugs are so formed to project into their respective circumferential groove and coact with the side walls thereof, but so as to permit the rotational movement and prevent the relative sliding movement. In an alternate embodiment only two swivel elements are utilized; a first like the end element and the second like the center element but with only one reduced end and groove.

19 Claims, 4 Drawing Figures

LAMP SWIVEL

This application is a continuation of application Ser. No. 735,543, filed May 20, 1985, now abandoned.

BACKGROUND OF THE INVENTION-FIELD OF APPLICATION

This invention relates to swivels; and more particularly, to swivels for lamps and the like.

BACKGROUND OF THE INVENTION-DESCRIPTION OF THE PRIOR ART

Many lamps, or lighting devices merely mount a bulb on a fixed base or support post. While relatively simple in construction such a lamp configuration lacks versatility in that if the user desires to illuminate a particular location they must move the entire lamp. This is not always possible or desirable.

Other lamps incorporate one or more swing arms. One end of the swing arm is usually supported by or mounted to a support post; while the other end of the swing arm supports or carries the lighting elements of the lamp (i.e. the bulb socket, bulb, shade etc.). Many swing arm lamps utilize swivels, or swivel assemblies, to mount the swing arm to the support member and thus enable the swing arm and lighting elements carried thereby to be swung about an axis of rotation through the support member. Thus, a greater versatility is provided by such a lamp since the lighting elements can be selectively positioned to illuminate any one of many desired locations.

Some swing arm lamps connect the swing arm to its support member by a swivel; while others utilize a pair of swing arms connected one to the other by a swivel or swivel assembly. It is also possible in such swing arm lamps to not only connect the swing arms to each other by a swivel but also to connect a swing arm to its support member by a swivel. In such swing arm lamps even greater versatility is provided for selective positioning of the illuminating members of the lamp in that the swing arms can be selectively positioned with respect to the support post and with respect to each other.

Some swivels, or swivel assemblies, are relatively complex in construction and accordingly in cost thus adding undesirably to the cost of the lamp. Many swivel assemblies utilize a pair of members connected together so as to facilitate relative swivelling movement between the members. However, if such swivel members are not secured to each other so as to prevent separation thereof then it is possible that they may separate and elements of the lamp may be damaged.

Other swivel assemblies may be interconnected to permit relative rotation, or swivelling action, about an axis of rotation through the swivel; but so as to prevent relative displacement of one swivel member with respect to the other along the axis of rotation. However, to provide such a connection by a headed screw which passes through one member and coacts with the other usually leaves an ugly and obtrusive screw head extending from the swivel assembly. In addition, an opening must be formed through at least one swivel member for the headed screw and the opening must be tapped. The drilling of the opening and tapping of same are relatively expensive operations and add unwanted cost to the swivel assembly. Other swivels may eliminate the obtrusive screw head by utilizing a sunken hex screw but these still require the expense of drilling the opening and of forming screw threads therein.

SUMMARY OF THE INVENTION

It is therefore an object of this invention to provide a new and improved swivel assembly.

It is another object of this invention to provide a new and improved swivel assembly for a lamp.

It is yet another object of this invention to provide a new and improved swivel assembly for swing arm lamps.

It is still another object of this invention to provide a new and improved swivel assembly for interconnecting lamp swing arms to each other and to the lamp support member.

It is yet still another object of this invention to provide a new and improved interconnection for the members of a lamp swivel assembly.

It is a further object of this invention to provide a new and improved method and procedure for interconnecting the members of a lamp swivel assembly.

This invention involves lamp swivel assemblies; and contemplates interconnecting the members of the swivel assembly together so as to permit relative rotation of one with respect to the other about an axis of rotation passing through the swivel assembly, but so as to prevent relative movement of one swivel member with respect to the other along said axis of rotation. The interconnection is provided by a swaging operation which displaces a piece of the material of one swivel member into a grove formed in the other swivel member.

Other features and advantages of the invention in its details of construction and arrangement of parts will be seen from the above from the following description of the preferred embodiments when considered with the drawing and from the appended claims. In addition, these and other objects and advantages of the present invention will become evident from the description which follows:

DESCRIPTION OF THE PREFERRED EMBODIMENTS

For convenience, the invention will be described as applied to a lamp wherein a pair of light sources are each carried at one end respectively of a pair of first tubular swing arms mounted to move with respect to each other. The other ends of the swing arms are connected by a swivel assembly to a first end of a second tubular swing arm. The other end of the second swing arm is, in turn, mounted to a swivel assembly carried at the top of a lamp support post the bottom of which is mounted to a base adapted to be placed upon a floor. The swing arms, swivels, support posts and base are formed of brass. It should be understood, nevertheless, that: a single light source may be carried by a pair of swing arms mounted in parallel fashion to the swivel assembly but so as not to move with respect to each other; that other arrangements of light sources and swing arms are possible; that the swing arms, swivels, support post, and base may be formed from other metals, or from plastic, wood or other suitable materials or combinations thereof; and that the lamp support post may be sized to facilitate placement of the lamp upon a table desk, credenza, wall bracket, or the like.

Figure 1:
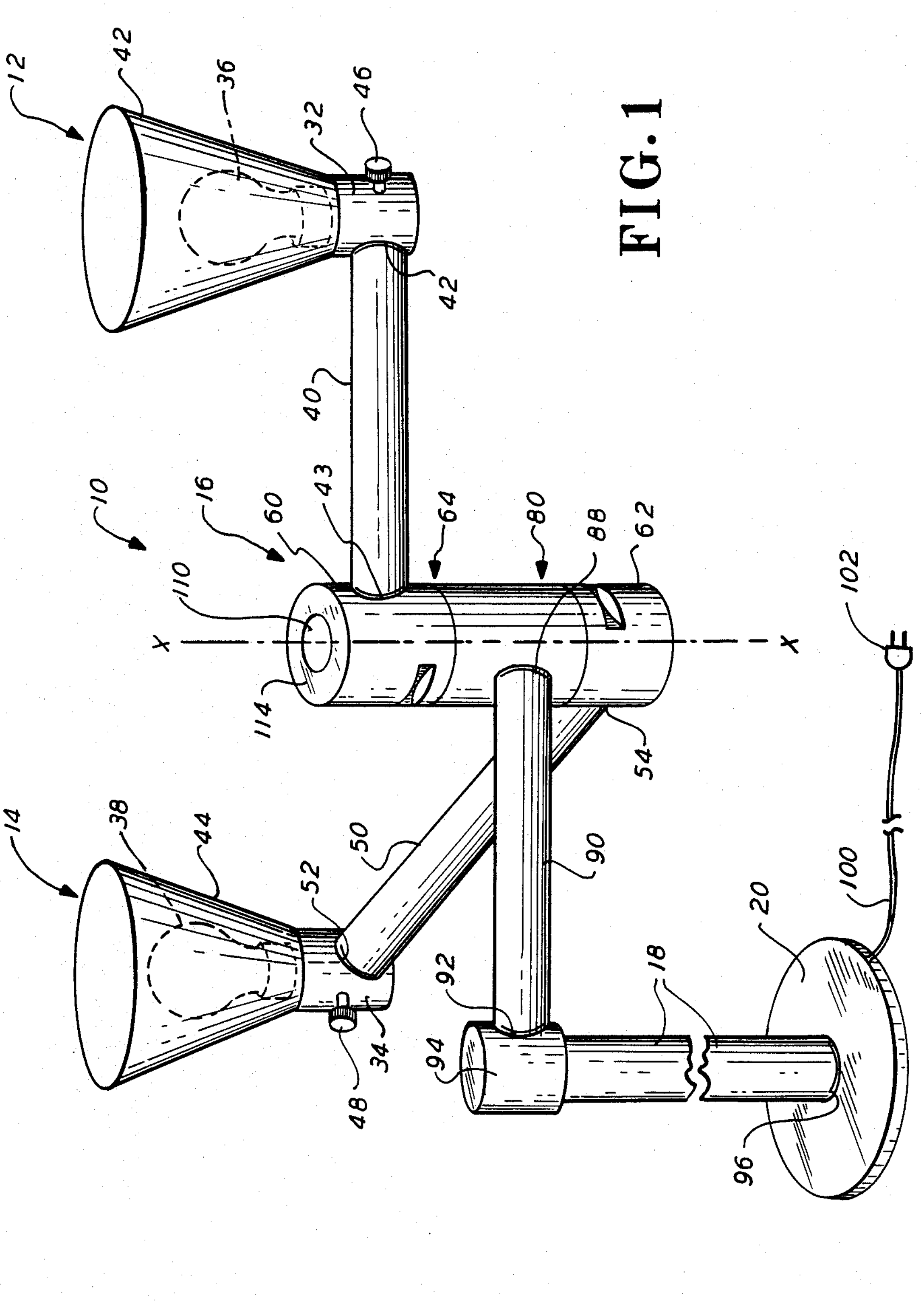
FIG. 1 is a perspective showing of a lamp incorporating the instant invention.

With reference to FIG. 1, there is generally shown at 10 a lamp incorporating a first light source 12 and a second light source 14 each respectively carried by a swing arm assembly 16 that is, in turn, supported by a support post 18 which extends up from a base 20.

Support base 20 and support post 18 are formed from suitable metal such as brass, or which has been brass plated. Support post 18 extends up from base 20 a distance appropriate to support light sources 12 and 14 from the floor. Support post 18 and base 20 may otherwise be sized to support light sources 12, 14 off a table, desk or the like.

Light sources 12, 14 are each identical in construction and incorporate conventionally available bulb sockets 32, 34 which receive bulbs 36, 38 and mount conical shades 42, 44. A thumb switch 46, 48 is provided respectively for sockets 32, 34 to facilitate turning bulbs 36, 38 on and off. Shades 42, 44 may be of any convenient configuration and disposed with bulbs 36, 38 and sockets 32, 34, to face up (as shown) down, out or in any desired direction. If desired, sockets 32, 34 may be mounted to swivels which are in turn carried by swing arm assembly 16 so that light source 12, 14 may be disposed in any one of many selected positions.

Bulb sockets 32, 34 are each connected to swing arms 40 and 50 respectively, of swing arm assembly 16, at ends 42, 52 thereof. The connection is accomplished by forming socket 32, 34 with internally threaded openings and by forming ends 42, 52 of arms 40, 50 with external threads, and thereafter threading sockets 32, 42 onto ends 42, 52 of arms 40, 50. Other suitable connecting means may also be utilized to connect sockets 32, 34 to arms 40, 50.

The other ends 43, 54 of swing arms 40, 50 are similarly connected to end elements 60, 62 of a swivel assembly 64 (i.e. ends 43, 54 of arms 40, 50 are formed with external threads that are mated with internal threads 66, 68 (FIG. 2) of openings 72, 74 formed in end elements 60, 62 of swivel assembly 64). A center element 80 is interconnected to end elements 60, 62, as will be hereinafter explained, and forms therewith swivel assemblies 64. An opening 82 (FIG. 2) is formed through center element 80 and has threads 84 formed therein to receive external threads formed at end 88 of a swing arm 90 the other end 92 of which is threaded into a swivel 94 carried on top of post 20.

Support post 18 is formed from tubular stock and of a suitable material such as brass, steel, aluminum or the like. Post 18 is of circular cross-section but may be of any other convenient cross-section; and may also be formed from solid bar stock where suitable. An appropriate finish may be applied to the outer surface of post 18. The lower end 96 of post 18 is secured by suitable means to base 20 which is fabricated from a suitable material compatible with that of support post 18.

Swing arms 40, 50, and 90 are also formed of tubular stock of circular cross-section, and of a material corresponding to the material used for support post 18. An electrical conductor 100 of suitable material extends from base 20 through suitable channels in post 18, arm 90, swivel assembly 64, arms 40 and 50 to be connected to bulb sockets 32, 34 and switches 46, 48 thereof. A suitable male plug 102 is provided at the end of conductor 100 to facilitate connection of lamp 10 to an appropriate source of electricity.

End elements 60, 62 are connected to center element 80 so as to permit rotation thereof about a vertical axis of rotation X—X (FIG. 1) extending through swivel assembly 64. It should be recognized that axis of rotation X—X may extend in any direction depending upon the disposition of swivel assembly 64.

Each end element 60, 62 is formed of tubular stock with openings 72, 74 respectively and with threads 66, 68 respectively formed therein. A center opening 110, 112 extends through elements 60, 62 respectively; with the walls 114, 116 thereof having a uniform thickness for a first portion of the lengths thereof and being of reduced thickness and enlarged diameter at 118, 120 for the remainder thereof to provide swivel seats 130, 132 respectively. The outer diameters of end elements 60, 62 are formed identical to the outer diameter of center element 80.

A first end 140 of center element 80 and a second end 142 of center element 80 are each formed of reduced diameters and with grooves 144, 146 respectively formed thereabout. The reduced diameters of ends 140, 142 provide shoulders 150, 152 on a central portion 156 of center element 80. Ends 140, 142 are of diameter to facilitate insertion thereof into enlarged portions 118, 120 of end elements 60, 62 respectively with a sliding fit. The lengths of ends 140, 142 correspond to the lengths of enlarged portions 118, 120 of end elements 60, 62 so that end walls 160, 162 of ends 140, 142 butt up against shoulders 130, 132 of end elements 60, 62 and so that shoulders 150, 152 of outer element butt up against end walls 164, 166 of end elements 60, 62 respectively.

Figures 2, 3, 4:
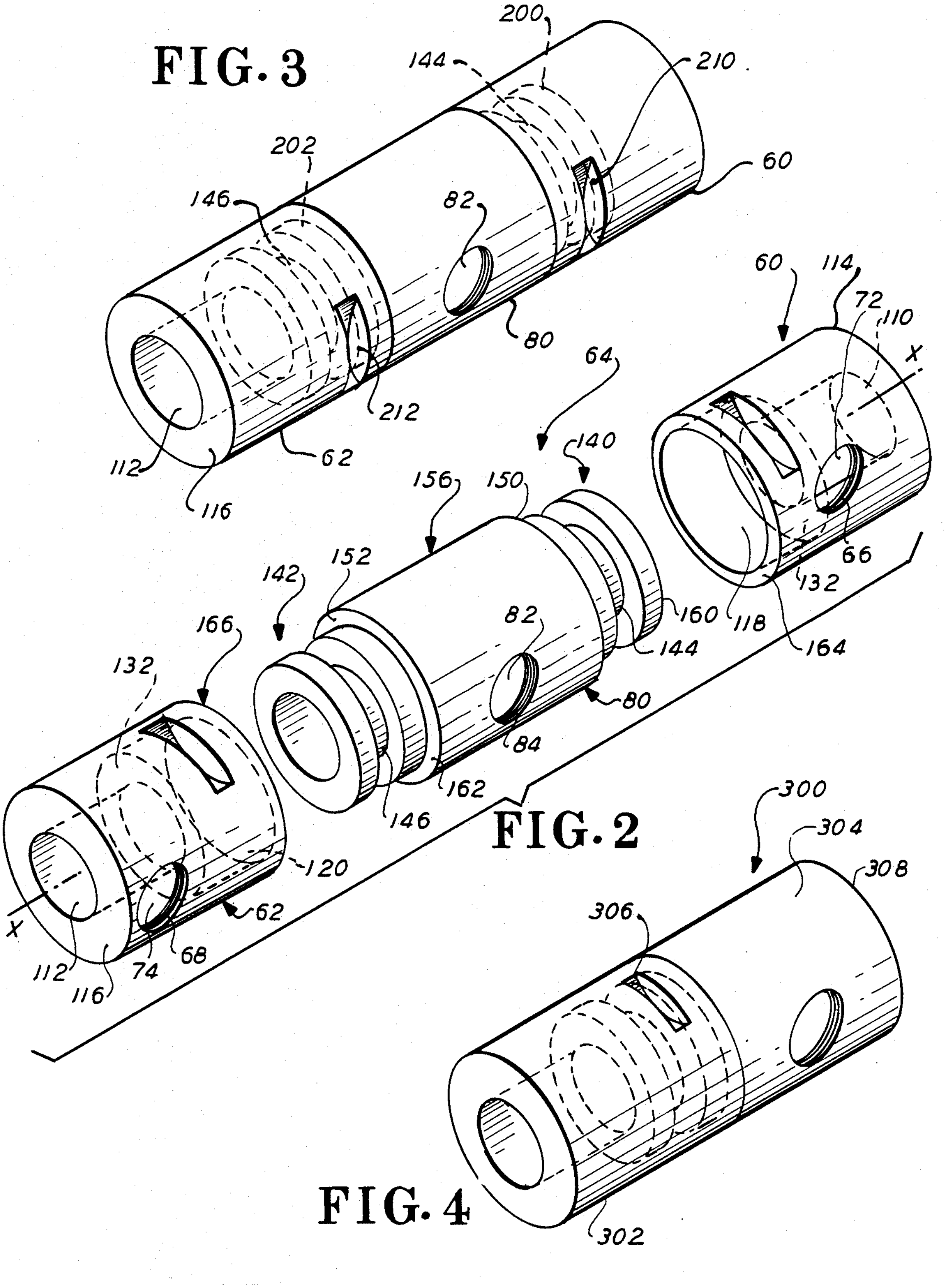
FIG. 2 is an enlarged isometric view of the swivel assembly of the lamp of FIG. 1.
FIG. 3 is an isometric view of the swivel assembly of FIG. 2 assembled together.
FIG. 4 is an enlarged isometric view of an alternate embodiment of lamp swivel assembly.

Swivel assembly 64 is assembled so that end elements 60, 62 may rotate about axis of rotation X—X but so that they may not slide along axis X—X and away from center element 80. This is accomplished as shown in FIG. 3, by forming swages 200, 202 in end elements 60, 62 by conventional swaging process and tools. Each swage 200, 202 is formed by applying pressure to the material of end elements 60, 62 to displace such material so that a projecting lug like portion thereof 210, 212 extends into enlarged portions 118, 120. Each projection or lug 210, 212 is located and sized to extend into its respective groove 144, 146 of ends 140, 142 of center element 80, but so as to permit relative rotation between end elements 60, 62 and center element 80. The sides of lugs 210, 212 coact with the side walls of grooves 144, 146 to prevent sliding movement of end elements 62, 64 along axis X—X and away from center element 80 once so assembled. Swivel 94 may be similarly formed.

If desired, the swivel assembly may be formed as shown for swivel assembly 300 of the embodiment of FIG. 4. Swivel assembly 300 includes only one end element 302 formed identical to end element 60 and 62 of the embodiments of FIGS. 1-3. The other element 304 is formed with an end 306 thereof similar to ends 140, 142 of center element 80 of the embodiment of FIGS. 1-3; but with an end 308 that is of uniform outer and inner diameter. Thus, swivel assembly 300 includes only two elements (302, 304) and is utilized to interconnect only two swing arms and not three as shown for the embodiment of FIGS. 1-3.

It should be understood that while the embodiment of FIGS. 1-3 shows the light source swing arms 40, 50 extending from end elements 60, 62 and the center element 80 utilized to connect swing arm assembly 16 to support post 18 that other arrangements are possible. Thus, end element 62 may be the one connected to swing arm 90 while light source swing arms 40, 50 extend from end element 60 and center element 80 respectfully. Alternatively, a single light source may be carried by a pair of parallel disposed swing arms extending from end element 60 and center element 80.

As various possible embodiments might be made of the above invention, and as various changes might be made in the embodiment above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby, since the embodiments of the invention particularly disclosed and described herein above are presented merely as an example of the invention, coming within the proper scope and spirit of the appended claims, will of course readily suggest themselves to those skilled in the art. Thus, while there has been described what is at present considered to be preferred embodiments of the invention, it will thus be obvious to those skilled in the art that various changes and modifications may be made therein, without departing from the invention, and it is therefore, aimed in the appended claims to cover all such changes and modifications as fall within the true spirit and scope of the invention, and it is understood that, although I have shown the preferred form of my invention, that various modifications may be made in the details thereof, without departing from the spirit as comprehended by the following claims.

What is claimed is:

1. A swivel assembly for a lamp; comprising:
(a) first swivel means;
(b) second swivel means; and
(c) interconnection means carried by said first swivel means and said second swivel means to interconnect said first swivel means and second swivel means for relative rotational movement with respect to each other about an axis of rotation passing through the swivel assembly, but so as to substantially prevent relative sliding movement of said first swivel means away from said second swivel means along said axis of rotation;
(d) said interconnection means including a circumferential groove with side walls formed in an outer surface of said second swivel means, and a lug deformed from the material of said first swivel means by displacing the material of a wall thereof said lug for projecting into said groove and for coacting with said side walls for substantially preventing said sliding movement along said axis of rotation.

2. The swivel assembly of claim 1, wherein said first swivel means and said second swivel means are each formed of tubular stock with a first end portion of said second swivel means having a reduced outer diameter formed for a sliding fit within an enlarged inner diameter of a first end portion of said first swivel means; said first end portion of said second swivel means having said circumferential groove formed therein and said first end portion of said first swivel means having said lug formed from the material thereof.

3. The swivel assembly of claim 2, wherein said lug is formed by swaging.

4. The swivel assembly of claim 3, including third swivel means and additional interconnection means carried by said second swivel means and said third swivel means to interconnect said second swivel means and said third swivel means for relative rotational movement with respect to each other about said axis of rotation, for substantially preventing relative sliding movement of said third swivel means away from said second swivel means along said axis of rotation; said additional interconnection means including an additional groove with side walls formed in an outer surface of said second swivel means spaced from said groove and an additional lug deformed from the material of said third swivel means by displacing the material of a wall thereof for projecting into said additional groove and for coacting with said side walls thereof for substantially preventing said sliding movement along said axis of rotation.

5. The swivel assembly of claim 4, wherein said third swivel means is formed of tubular stock with a second end portion of said second swivel means having a reduced outer diameter formed for a sliding fit within an enlarged inner diameter of a first end portion of said third swivel means; said second end portion of said second swivel means having said additional circumferential groove formed therein and said first end portion of said third swivel means having said additional lug formed from the material thereof.

6. The swivel assembly of claim 5, wherein said additional lug is formed by swaging.

7. A lamp; comprising:
(a) support means;
(b) swing arm means carried by said support means;
(c) said swing arm means including a swivel assembly;
(d) said swivel assembly including:
(i) first swivel means;
(ii) second swivel means; and
(iii) interconnection means carried by said first swivel means and said second swivel means to interconnect said first swivel means and second swivel means for relative rotational movement with respect to each other about an axis of rotation passing through the swivel assembly, but so as to substantially prevent relative sliding movement of said first swivel means away from said second swivel means along said axis of rotation;
(iv) said interconnection means including a circumferential groove with side walls formed in an outer surface of said second swivel means, and a lug deformed from the material of said first swivel means by displacing the material of a wall thereof said lug for projecting into said groove and for coacting with said side walls thereof for substantially preventing said sliding movement along said axis of rotation.

8. The swivel assembly of claim 7, wherein said first swivel means and said second swivel means are each formed of tubular stock with a first end portion of said second swivel means having a reduced outer diameter formed for a sliding fit within an enlarged inner diameter of a first end portion of said first swivel means; said first end portion of said second swivel means having said circumferential groove formed therein and said first end portion of said first swivel means having said lug formed from the material thereof.

9. The swivel assembly of claim 8, wherein said lug is formed by displacing material of a wall of said first end portion of said first swivel means.

10. The swivel assembly of claim 8, wherein said lug is formed by swaging.

11. The swivel assembly of claim 8, including third swivel means and additional interconnection means carried by said second swivel means and said third swivel means to interconnect said second swivel means and said third swivel means for relative rotational movement with respect to each other about said axis of rotation, and for substantially preventing relative sliding movement of said third swivel means away from said second swivel means along said axis of rotation; said additional interconnection means including an additional groove with side walls formed in an outer surface of said second swivel means spaced from said groove and an additional lug deformed from the material of said third swivel means by displacing the material of a wall thereof said additional lug for projecting into said additional groove for coacting with said side walls thereof for substantially preventing said sliding movement along said axis of rotation.

12. The swivel assembly of claim 11, wherein said third swivel means is formed of tubular stock with a second end portion of said second swivel means having a reduced outer diameter formed for a sliding fit within an enlarged inner diameter of a first end portion of said third swivel means; said second end portion of said second swivel means having said additional circumferential groove formed therein and said first end portion of said third swivel means having said additional lug formed from the material thereof.

13. The swivel assembly of claim 12, wherein said additional lug is formed by swaging.

14. The method of forming a swivel assembly for a lamp; comprising the steps of:

(a) forming a first swivel means;
(b) forming a second swivel means; and
(c) forming interconnection means between said first swivel means and said second swivel means to interconnect said first swivel means and second swivel means for relative rotational movement with respect to each other about an axis of rotation passing through the swivel assembly, but so as to substantially prevent relative sliding movement of said first swivel means away from said second swivel means along said axis of rotation;
(d) said interconnection means being formed by forming a circumferential groove with side walls formed in an outer surface of said second swivel means, and by forming a lug formed from the material of said first swivel means by displacing the material of a wall thereof so as to project into said groove and so as to coact with said side walls thereof to so substantially prevent said sliding movement along said axis of rotation.

15. The method of forming a swivel assembly of claim 14, wherein said first swivel means and said second swivel means are each formed of tubular stock with a first end portion of said second swivel means having a reduced outer diameter formed for a sliding fit within an enlarged inner diameter of a first end portion of said first swivel means; said first end portion of said second swivel means having said circumferential groove formed therein and said first end portion of said first swivel means having said lug formed from the material thereof.

16. The method of forming a swivel assembly of claim 15, wherein said lug is formed by swaging.

17. The method of forming a swivel assembly of claim 16, including forming third swivel means and forming additional interconnection means carried by said second swivel means and said third swivel means to interconnect said second swivel means and said third swivel means for relative rotational movement with respect to each other about said axis of rotation, but so as to substantially prevent relative sliding movement of said third swivel means away from said second swivel means along said axis of rotation; said additional interconnection means being formed by forming an additional groove formed in an outer surface of said second swivel means spaced from said groove and by forming an additional lug from the material of said third swivel means by displacing the material of a wall thereof so as to project into said additional groove and so as to coact with said side walls thereof to so substantially prevent said sliding movement along said axis of rotation.

18. The method of forming a swivel assembly of claim 17, wherein said third swivel means is formed of tubular stock with a second end portion of said second swivel means having a reduced outer diameter formed for a sliding fit within an enlarged inner diameter of a first end portion of said third swivel means; said second end portion of said second swivel means having said additional circumferential groove formed therein and said first end portion of said third swivel means having said additional lug formed from the material thereof.

19. The method of forming a swivel assembly of claim 18, wherein said additional lug is formed by swaging.

* * * * *